March 18, 1969  W. P. GUENTHER  3,433,422
METHOD AND APPARATUS FOR ROTARY PROCESSING AND CLASSIFICATION
Filed July 14, 1965

INVENTOR.
WOLFGANG PETER GUENTHER
BY
Belker, Kimmelman & Mayerman
ATTORNEYS

March 18, 1969  W. P. GUENTHER  3,433,422
METHOD AND APPARATUS FOR ROTARY PROCESSING AND CLASSIFICATION
Filed July 14, 1965

INVENTOR.
WOLFGANG PETER GUENTHER
BY
Bilker, Kimmelman & Mayerman
ATTORNEYS

Fig. 7

INVENTOR.
WOLFGANG PETER GUENTHER

March 18, 1969  W. P. GUENTHER  3,433,422
METHOD AND APPARATUS FOR ROTARY PROCESSING AND CLASSIFICATION
Filed July 14, 1965  Sheet 5 of 5

INVENTOR.
WOLFGANG PETER GUENTHER
BY
Bilker, Kimmelman & Moserman
ATTORNEYS

United States Patent Office 3,433,422
Patented Mar. 18, 1969

3,433,422
METHOD AND APPARATUS FOR ROTARY
PROCESSING AND CLASSIFICATION
Wolfgang Peter Guenther, Cheshire, Conn., assignor to
Entoleter, Inc., Hamden, Conn., a corporation of Delaware
Filed July 14, 1965, Ser. No. 471,951
U.S. Cl. 241—61                              20 Claims
Int. Cl. B02c *19/00;* B04c *5/04, 5/06*

ABSTRACT OF THE DISCLOSURE

A centrifugal impact mill is mounted toward the top of a generally cylindrical body having angled perforations therein. Particulate material milled by the impact mill falls downward and is subjected to an inwardly spiralling flow of air coming in through said apertures causing the heavier particles to be thrown outwardly by centrifugal force. Toward the lower part of the cylindrical body a second, rising and inwardly spiralling flow of air is produced by air being deflected inward and upward around a generally conical member. This second flow tends to move any remaining fine particles inward and upwardly toward the conical member for removal by suction thereat.

---

This invention relates to a method and apparatus for rotary processing and/or classification. In particular, it is concerned with a method and apparatus for centrifugal impact milling followed by classification of the milled particles.

In industry, there is a great need for apparatus in which, after a milling or other similar processing operation, there is a subsequent and effective classification of the milled or processed product into desired size ranges. For efficiency and economy in processing it is often highly desirable to be able to classify the milled product into the highest possible concentration of particles having a size less or greater (as desired) than a predetermined "cut point." Additionally, to conserve space and to prevent reagglomeration of the milled or processed particles, it is often desirable that the classification operation be accomplished very soon after the milling or processing operation.

There have been a number of prior art apparatuses which sought to accomplish these objectives. However, these apparatuses usually had one or more disadvantages. Some of them had rather large horsepower requirements. Some of them were very high in original equipment cost. Others introduced so much elevation in temperature that auxiliary and expensive cooling apparatus was required. Still others were very space-consuming. Many of them did not produce as high a percentage of classified particles of the desired size as was desired particularly at high volume capacities. Others had a profusion of moving parts which made for undue maintenance or replacement problems. These latter types also required more laborious cleaning procedures.

It is, therefore, an object of the present invention to provide a novel rotary processor-classifier combination which is less expensive than competitive apparatus previously offered.

Another object of the present invention is to provide a novel rotary processing-classifying apparatus which produces a very high percentage of processed materials within the desired size range.

Yet, another object of the present invention is to provide a novel rotary processing-classifying apparatus which produces a very high percentage of processed materials without introducing an elevation in heat which would require considerable auxiliary cooling equipment.

Still, another object of the present invention is to provide a novel rotary processing-classifier apparatus which requires less driving power than prior art devices.

A further object of the present invention is to provide a novel centrifugal impact mill-classifier apparatus which provides a greater percentage of mill product within a desired range than has heretofore been obtainable at low initial equipment cost.

Another object of the invention is to provide a very efficient centrifugal impact mill-classifier which requires very little space.

Still another aim of the present invention is to provide a novel rotary mill-classifier apparatus with a minimum of moving parts.

Other objects of the invention include the provision of methods consistent with the aforementioned objects and those which will occur to one skilled in the art upon perusal of the specification and drawings hereof.

Another objective of the present invention is to provide a classification method and/or apparatus which involves no moving mechanical parts yet comprises at least two classification zones for increased efficiency.

In accordance with the invention, there is provided a classifier having substantially no moving parts. The material to be classified is applied toward the upper end of the classifier and is subjected to an incoming current of air which sets up a spiralling stream. The material to be classified is entrained within the stream and tends to move downwardly under the influence of gravity. Therefore, in the upper region of the classifier there is a first classification zone in which there is a resultant descending helical path of entrained material in which the centrifugal force tends to fling the coarser particles more outwardly than the finer particles. Also, the incoming air causes the fine particles to be driven more inwardly than the coarse particles because the fines are subjected to a greater ratio of drag to centrifugal force than the coarse particles are. The classification chamber is sufficiently long to permit the descending helix to continue downward for some distance. There is also disposed intermediate the top and bottom of the classification region a fines extraction means generally disposed about the axis of the apparatus.

In a preferred form of the invention the fines extraction means includes a generally conical member and the air drawn through the lower section of the perforated outer wall of the classifying section is directed toward a conical surface of that conical member. The air is caused by that surface and the geometry of the surrounding chamber to produce a generally upward spiral of air which is generally concurrent with the first descending helical path. This upward spiral constitutes a second classification operation which tends to raise any fines that may have proceeded below the fines extraction region upwardly and inwardly toward the latter so that they will pass out with the other fines.

In one form of the present invention there is provided an upper rotary processing apparatus such as a centrifugal impacting mill. To this mill is applied the material to be processed. The mill comminutes the material and sets up a descending helical stream of air (or other desired gas) which entrains a mixture of various sized particles of the processed material. Just below the mill there is a classification section which extends for a predetermined distance and includes a perforated outer wall for introducing tangentially an additional quantity of gas from the ambient atmosphere for example to the descending helical stream in generally concurrent relation thereto. This gas is introduced inwardly from the exterior of said classification section at a plurality of vertically spaced points along the length of the classification section. It tends to produce a centripetal or drag force component which drives the finer processed particles more inwardly than the coarser particles. Means are provided intermediate the upper and lower ends of the helical path means for extracting the more inwardly (axially located) circulating components, i.e., the "fines." This means preferably comprises a generally conical hollow member which is truncated and whose walls slope downwardly and outwardly. The coarser components are extracted at the lower end of the helical path toward the outer extremity thereof.

In one form of the invention, part of the wall of the generally conical member is perforated to allow air to be impelled outwardly in a spiral path which is generally concurrent with the vertical helical path. This auxiliary spiral is augmented by the incoming air and will produce an upward helical stream of air. This stream entrains upwardly any fines that have gone below the fines extraction region whence they are removed.

In another form of the invention, the conical member is made with entirely unperforated walls and the incoming air is drawn against these walls such that an upwardly spirally moving secondary stream of air is produced which entrains the fines and carries them upwardly and inwardly toward the fines extraction region.

According to another form of the invention, the outer wall of the classification section can be made so as to be inverted to allow it to be used when the rotary processing element is reversed in its rotation. This distributes the wear on the rotary element and prolongs its life. In this form substantially coaxial coarse particle and fine particle discharge hoppers are provided which permit efficient extraction of these respective fractions regardless of the direction of rotation. Thus the abrasive effects of the processed materials upon the wall of the classification section and on the hoppers can be distributed to prolong their useful lives.

Other forms of the invention are also explained below.

Figures 1, 3, 4, 5:
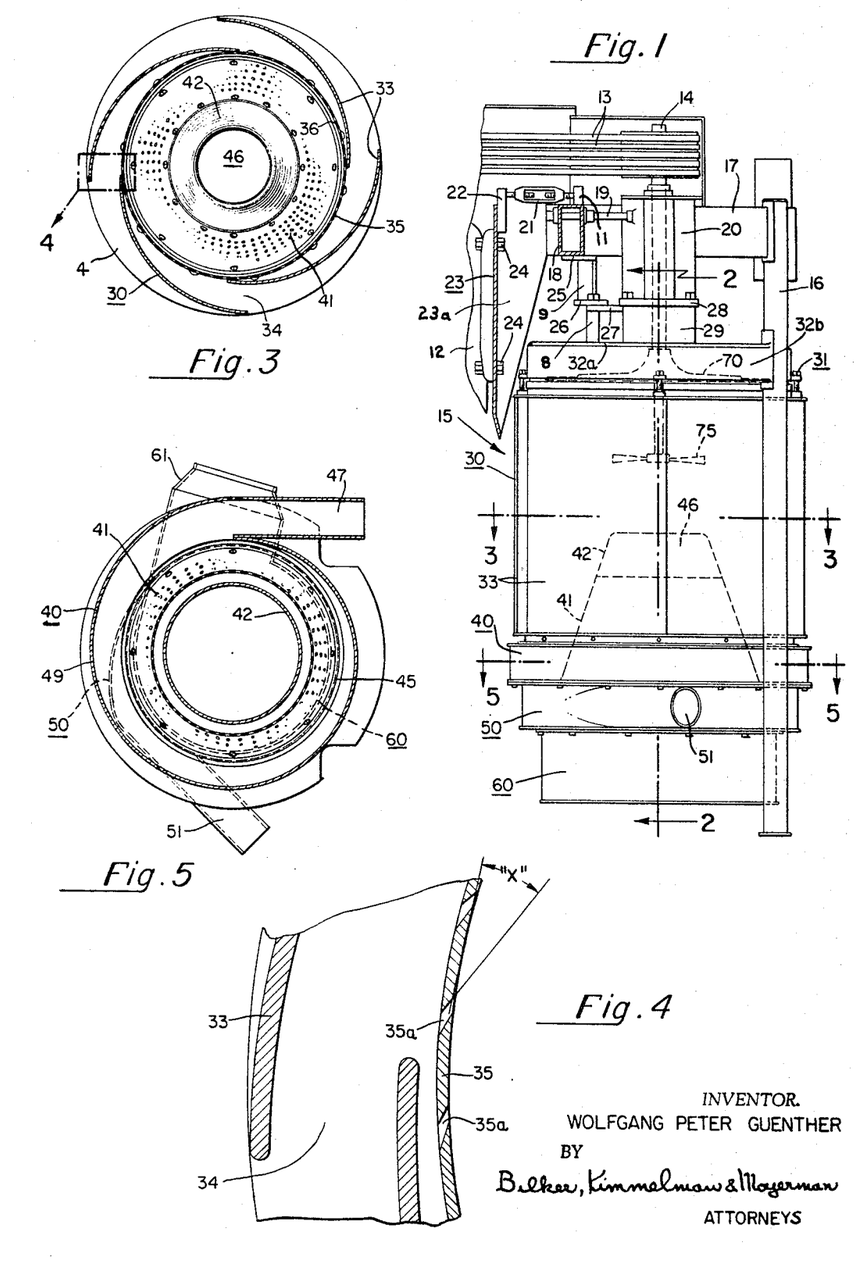
FIGURE 1 is a side elevation view of the overall apparatus according to one form of the present invention.
FIGURE 3 is a plan view, partly sectional, of the apparatus shown in FIGURE 1 taken along the line 3—3 in the direction indicated.
FIGURE 4 is an enlargement of the portion of FIGURE 3 shown within the broken line rectangle 4 thereof.
FIGURE 5 is a partly sectional view of the apparatus shown in FIGURE 1 taken along the section line 5—5 in the direction indicated.

*Structure of embodiment of FIGURE 1—frame and support*

Referring to FIGURES 1–6 there is shown one form of the present invention. Much of the structure for supporting and driving the rotor of the centrifugal impacting mill may be substantially identical to that shown in U.S. Patent 3,021,083 issued to Kurt H. Conley on Feb. 13, 1962. It is included here solely as one illustrative environment for the present invention and does not constitute part of the present invention. This driving and supporting structure includes a driving motor 12 attached by bolt and nut assemblies 24 to a vertical plate 23 which has two perpendicular portions 23a. The vertical plate 23 is slidably mounted to and between two longitudinal beams 17 whose ends are affixed to posts such as the posts 16 at four corners of the frame. A transverse plate 22 is affixed to the plate 23. There is also located a transverse beam 18 attached at each end to one of the longitudinal beams 17. Mounted to the beam 18 is a bar 11. Between the bars 22 and 11 there is disposed a turnbuckle 21 which can be adjusted to vary the spacing between the laterally movable motor-mounting plate 23 and the combined centrifugal impact mill-classifier 15. This adjustability enables the tension on the belts 13 to be varied.

The motor 12 drives a plurality of belts 13 which are in contact with a sheave mounted to the upper end of a rotor shaft 14. The rotor shaft 14 passes through a bearing casing 20 into the chamber defined by the rotor housing 32. The bearing casing 20 is connected by bolts 19 to the transverse beam 18. The beam 18 also is connected as by welding to a horizontal transverse member 25. Connected to the member 25 are a number of vertical members 9 that are connected at their lower ends to a horizontal member 26. A number of bolts are passed through apertures in the member 26 into upright members 8 which are connected to (or integral with) the upper surface 32a of the rotor housing 32. Also, there are two material input chutes 29 formed in or connected to the upper surface 32a having flanged portions 28 and a passageway 28a formed therein. Passageway 28a permits the entry of materials and a carrier gas such as air into the interior of the rotor casing 32. The casing 32 has a circular vertical member 32b which, at several points is formed into sockets that are attached, as by welding or bolting, the legs 16. The foregoing has been set forth merely as one illustrative way of suspending the combined mill-classifier assembly according to the present invention. Of course, many alternative types of support or suspension may be alternatively used.

*Rotor housing and its contents*

Figures 2, 6:
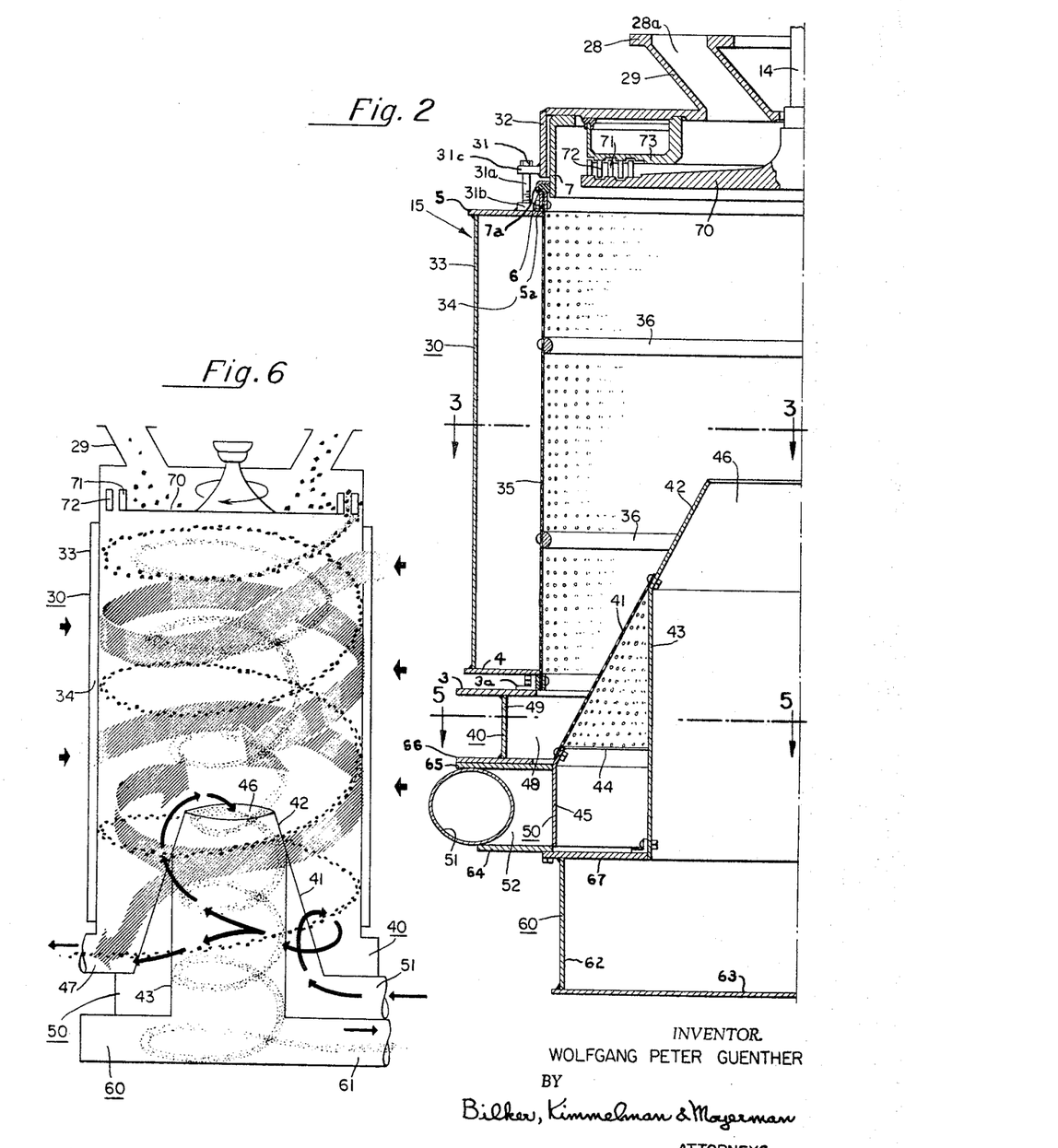
FIGURE 2 is a sectional view of the apparatus shown in FIGURE 1 taken along the section line 2—2 in the direction indicated.
FIGURE 6 is a conceptualized schematic drawing of the flow of particles and gases in the apparatus shown in FIGURE 1.

Within the rotor housing 32 there is disposed a rotor 70 attached to the lower end of the rotor shaft 14 by keying or other appropriate means. Toward the periphery of the rotor 70 are located three concentric circular rows of upstanding impactors 71. These rows meshed with or interdigitate with two rows or downwardly projecting impactors 72. Of course, any desired number of rows or shapes of impactors can alternatively be employed if desired. The upper ends of the latter impactors are fastened to a stator 73 that is mounted to the inner surface of the portion 32b of the housing. The stator 73 is generally annular in configuration.

The material to be processed such as material to be comminuted is fed into passageway 28a with a carrier gas such as air and falls upon the upper surface of the rotor 70. By virtue of centrifugal force, it is impelled outwardly at high speed against the sets of impactors 71 and 72 thereby breaking the material into smaller particles having a range of sizes. These broken particles and the air or other gas brought into the housing via passageway 28a are impelled outwardly of the impactors against a generally annular, inverted-L-sectioned member 7 whose upper surface is affixed to the lower surface of the part 32a. Attached to the outside of the liner 7 toward its lower edge is another inverted-L-sectioned ring 7a which includes a resilient sealing gasket ring 6.

*Classifier section*

The classifier section of the present invention is indicated generally at the numeral 30. It is suspended in a tight abutting relation to the rotor housing and assembly by means of a plurality of fastening sub-assemblies 31. These assemblies include a number of bolts 31a which pass through apertured horizontal members 31c affixed at various points to the vertical wall 32b. The lower ends of the bolt 31a engage threaded apertures in members 31b which are attached to an annular member 5. A vertical ring 5a is connected to the member 5 for supporting apertured wall 35 at its upper end. The classifier section 30 includes a chamber defined generally by the apertured wall 35. Wall 35 is held against the member 5a by bolts and nuts as shown. To assist in maintaining the rigidity of the wall member 35 a number of horizontal circular metal rings 36 are bolted to the member 35 at a number of points along its length. The rings 36 also serve to delay the downward spiral stream so as to increase the total classification time. It also introduces a local turbulence which tends to impel the material near the wall 35 back into the main spiral path. The lower end of the wall 35 is bolted at a number of points to L-sectioned clamps 3a disposed between horizontal annular members 3 and 4.

Between the horizontal annuli 4 and 5 there are a number of curved wall segments 33 welded thereto. They are curved to channel air into the classifier in a rotary direction which is the same as that in which the rotor 70 rotates. Their inner edges are held very closely against the apertured wall 35 and their outer edges are welded to a point near the edges of the members 4 and 5.

The classifier wall 35 is perforated with a number of apertures 35a which are angled in the same direction as the wall segments 33. Air entering into the space 34 between the walls 33 under the influence of suction from the fines discharge volute 60 is drawn through the tapered apertures 35a. The angle "X" may be approximately 20° although a range from about 5° to about 45° is possible. The air moving into the apertures 35a sets up an inwardly spiralling air stream which entrains the particles milled in the rotor section.

"Fines" extraction subassembly

Protruding upward into the region surrounded by the apertured wall 35 is a conical member comprising a truncated conical perforated wall section 41 bolted to an unperforated inclined wall portion 42. There is an opening 46 at the top of the wall 42. Vertical wall portion 43, which is generally cylindrical in shape, is a vertical extension of the wall 42. The lower end of the wall 43 is bolted to horizontal annulus 67 which itself is welded to the upper edge of vertical circular wall 62, the lower edge of the latter being welded to a circular baseplate 63. The opening 46 communicates with the fines discharge volute 60 and its outlet conduit 61. A strong suction source (not shown) such as a fan is coupled to the air flow in volute 60.

By the action of the external suction source, air in the region lying above the upper edge of the cone 42 and any fines entrained therein are drawn into the interior of walls 42, 43 and pass out through the fines discharge volute 60. Also, as a result of this suction, air is drawn in through air inlet duct 51 into an auxiliary air volute 50. This air is pulled up in the generally circular region just outside wall 43. It then passes outwardly through apertures in the perforated wall 41. These apertures are so made as to produce a spiral current of this auxiliary air stream which is generally concurrent with the spiralling air produced by the air coming through the angled apertures in wall 35. Because of the volute feed of this auxiliary air and the upward pull on the air exerted by the suction at opening 46 this auxiliary spiral will also have a generally upward component of motion.

The apertured walls 35 and 41 may both be fabricated from "Conidur" metal screens produced by Perforated Products, Inc. of Boston, Mass., or any other type of directionalized apertured screen or louver.

The purpose of this upward air spiral is to produce a vectorial component of air tending to counteract the force of gravity upon any fine particles that may be outside of the cone 42 and below the upper edge thereof. It, therefore, tends to lift and carry spirally inward any stray fines until they are within the central spiralling stream of fines that will be sucked down into the cone member 42. The coarse particles are not similarly affected by this updraft and maintain their descending outermost helical course near the interior surface of the wall 35. They eventually drop down past the apertured wall 41 and are drawn out by suction through the coarse discharge volute 40 into the outlet conduit 47. If desired, this coarse discharge may be recycled into the passageway 28a of the chute 29.

Generally, by providing a certain amount of space between the impact mill portion of the combined apparatus and the opening 46, the desired percentage of classified fines is increased. Of course, if the coarse particles are recycled, an even greater percentage of the desired fines can be extracted from the input material.

In the practice of the present invention, the distance between the material input zone, be it from a mill or from some other source, to the fines extraction region may be greater than with conventional classifying apparatus. By making this distance greater, the flow of gas and entrained materials therein can be freer because of the lesser possibility of wall friction than in prior art devices and consequently a net improvement in the classification can be achieved. Furthermore, by making this distance longer, the particles in the classification area may travel a longer path and therefore be under a greater total classification influence than is the case with prior art devices. In addition, this increased distance enables a higher classification volume to be achieved with a resultant higher capacity of the present novel classification device.

Of course, this distance can be selected to achieve various ends. For example, with a fixed diameter of the opening 46, if the fines extraction region is raised closer to the source of the material to be classified, there will be a greater percentage of coarser particles in the output of the fines extraction region. This is due in part to the increase in the amount of incoming air which is deflected upward along the conical surface and in part due to the more rapid movement of the incoming air into the region over the opening 46. This higher velocity air therefore tends to bring into opening 46 more of the coarse fraction than would be the case in which the opening 46 is more distant from the source of material to be classified.

FIGURE 6 shows the flow of the gases and materials according to the first form of the apparatus shown in FIGURES 1–6. Particles of the materials to be processed are admitted via chutes 29 to the rotor 70, are flung outwardly against impactors 71 and 72, and then fall under the influence of gravity in a downwardly spiralling stream. This spiralling stream has been set up initially by the rotation of the rotor in the impact mill section. Because of the effects of centrifugal force, the heavy particles are flung more outwardly in the descending spiral stream.

As the descending spiral of material passes the walls 35 of the classifier 30, air is sucked into the space 34 due to the suction created in the fine discharge volute 60. This incoming air is generally concurrent with the rotational flow of the descending spiral. It affects the finer particles more than the coarse particles, driving the fines more inwardly than the coarse particles.

Toward the lower portion of the classifier section, the incoming air is directed toward the inclined wall surfaces 41 and 42 and in a concurrent direction with respect to the spiral stream. The air passing outwardly through the perforated wall 41 will tend to produce an upwardly moving spiral which is concurrent with the downwardly moving spiral. The air coming through the perforated wall 35, in the section opposite the solid wall 41, 42, will also tend to be urged upwardly in a concurrent spiral. This will affect any fines in the classifier section outside of walls 41 and 42 which are below the opening 46 and to convey them upwardly into the general capture area of the central fines discharge opening 46. Thus it will be seen that there is an upper classification area which is chiefly determined by the spiral created by the incoming air through the apertured wall. There is also a lower classification area primarily concentrated in the general region of the conical walls 41 and 42 which tends to prevent the removal with the coarse particles of any fines that may have descended below the opening 46.

Second embodiment explained

Figure 7:
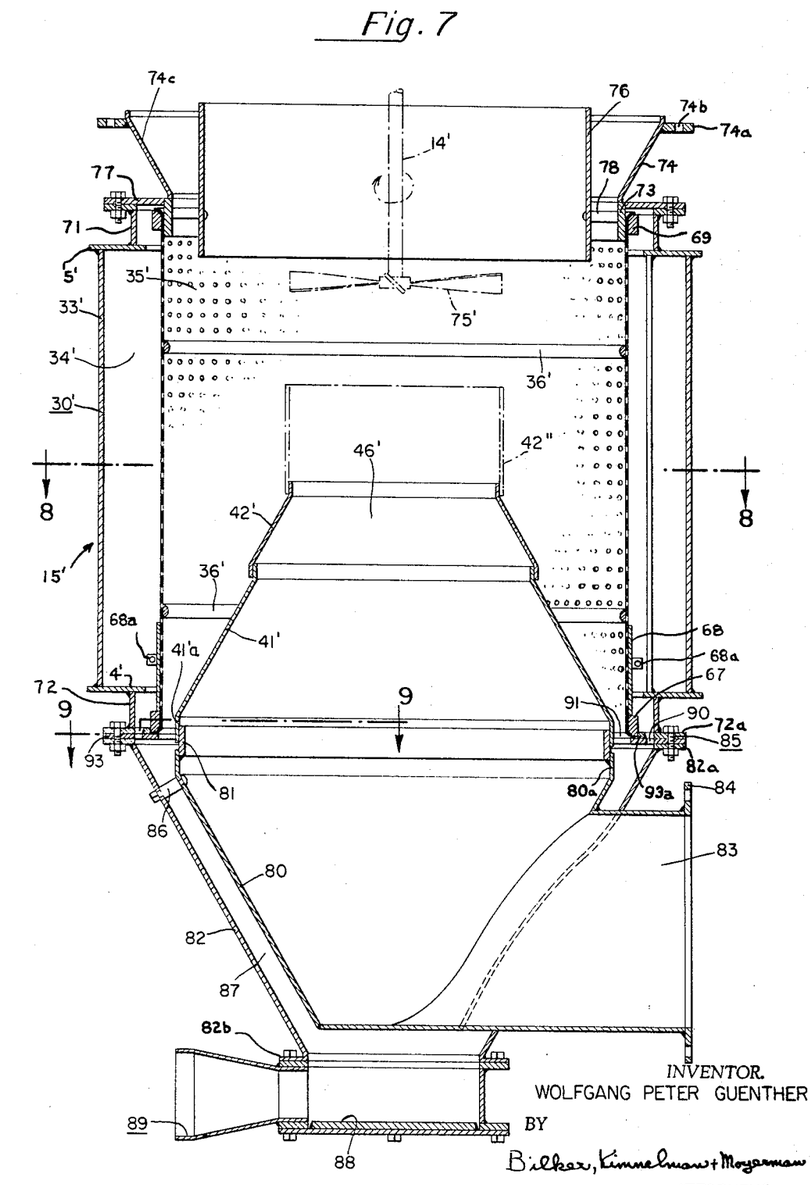
FIGURE 7 is an axial sectional view of another form of the present invention.
Figure 8:
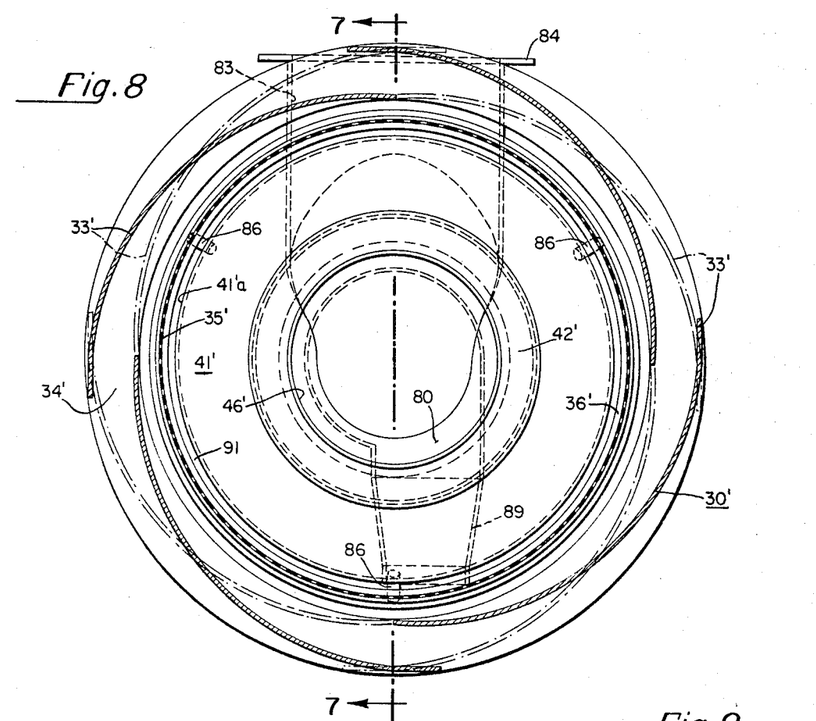
FIGURE 8 is a sectional view of the apparatus shown in FIGURE 7 taken along the sectional line 8—8 in the direction indicated.
Figure 9:
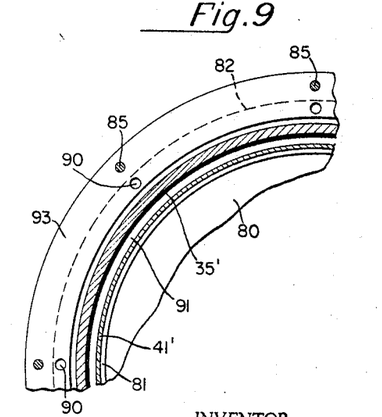
FIGURE 9 is a fragmentary, sectional view of a portion of the apparatus shown in FIGURE 7 taken along the line 9—9 in the direction indicated.

FIGURES 7-9 depict another form of the present invention. This form has provide to be more satisfactory in certain respects than the first form previously explained. One feature present in the second form is the fact that the classifier section may be inverted and the direction of rotation of the motor may be reversed so as to equalize the wearing effect of processed particles on the interior surface of the perforated classifier wall. Also, to accommodate the reversed rotor direction, instead of the three tangential discharge volutes 40, 50 and 60, which accommodate only one direction of rotation of the rotor, two substantially concentric cones are substituted. Furthermore, this form does not provide for an upwardly spiralling component of auxiliary air passing through an inner perforated wall section.

The support for the motor and the drive for the rotor as well as the rotor housing in this form of the invention may be identical to the one shown in the previous form. However, the clamp assemblies 31 (see FIGURE 1) engage an annular ring portion 74a of a conical member 74. The bolts 31a are passed through apertures in members 31c and through apertures 74b aligned therewith. The lower edge of the member 74 and an annular vertical wall 73 clamp the upper edge of the wall assembly 35' between them. The wall 73 is fixed to the inner edge of an annular member 77, by welding or otherwise. Positioned axially of the member 74 is a cylindrical wall 76 whose upper edge is close to the outer edge of the rotor 70. The wall 76 is maintained spaced inwardly of ring 73 by hollow pegs which receive bolts whose ends are screwed into threaded apertures in ring 73. Wall 76 is inserted to prevent high-speed coarse particles from ricocheting off of wall 74c directly into opening 46'. Alternatively, a rotating paddle 75' or disc may be added which projects any such particles outward to accomplish the same purpose. It also keeps up the speed of the descending helical stream. Another way of keeping high-speed coarse particles from bouncing into opening 46' from wall 74c is to equip the lower surface of rotor 70 with a plurality of radially disposed vanes or equivalent structures. These will set up an outward component of air which will deflect such particles outwardly. These also set up currents of air in vertical planes that will serve to aid in deflection of such particles.

To allow inversion of the entire classifier section 30' the latter is made substantially symmetrical. There is an inverted L-sectioned annular member 71 having its counterpart 72 located at the lower part of the classifier. The members 71 and 77 have respective aligned apertures with which nut and bolt assemblies are used to fasten them together. The horizontal annuli 4' and 5' are substantially identical and a clearance exists between their inner edges and the wall 35'. The lower clearance enables any material that gets through the apertures of wall 35' to go downward through apertures 90 and be taken out with exhausted coarse particles.

It will be noted that if the classifier section 15' is inverted, the angular positions of the wall members 33' will be reversed as shown in phantom in FIGURE 8 to account for the fact that the rotor is then made to rotate counterclockwise (as seen in plan view). The horizontal portion 72a of member 72 as shown in FIGURE 7 is clamped to an annulus 93 by means of bolts 85. The bolts 85 also pass through aligned apertures in the upper flanged edge 82a of a generally conical coarse discharge hopper 82, and nuts are used to secure them in place. The lower edge of the perforated wall 35' is spot welded to a free ring 67 which rests on annulus 93 and is held in position by several spaced members 93a that are welded to annulus 93.

Suspended by means of a number of spaced hollow pegs 86 within the coarse discharge hopper 82 is the fines hopper 80. Bolts pass through the pegs 86 and apertures in hopper 82 and nuts are affixed to their outer ends. Hopper 82 includes a conduit portion 83 having an apertured flange 84 for connection to ductwork or the like. The hopper 80 includes a vertical upper edge portion 80a which is welded to a circular member 81.

The vertical lower portion 41'a of the conical member 41' fits tightly about the ring 81 to hold it in place but may be easily disassembled therefrom. Similarly, the nesting lower edge of the conical portion 42' fits about the vertical upper edge portion of the member 41'. In certain cases, another generally cylindrical member 42' (in phantom) can be similarly force fit about the upper edge of the member 42'.

To obtain more efficient coupling between the spiral stream produced by the mill section and the upper portion of the classifier section 15', an auxiliary rotor shaft extension 14' may be provided with a disc or paddle 75' fixed to its lower end.

It will be noted that no internal secondary current of air is provided in this embodiment to increase the percentage of fines entering the opening 46'. In this form of the invention, the secondary classification is accomplished by the production of an upwardly spiralling concurrent stream of air resulting from the influx of air through wall 35' which curls upward around walls 41' and 42'. A split-ring baffle 68 may be positioned at any desired vertical position to prevent influx of air in the region covered thereby. The baffle might be placed in the position shown when the top wall 42' is in place, for example. The two halves of the baffle are joined by bolts passed through the tab-like projections 68a and which have nuts screwed to their ends.

In this form there is a clearance 91 just outside the lower edge portion 41'a and the inner edges of the members 72a, 93 and 82a which allows both coarse and fine particles to enter the interior 87 of the hopper 82 for exit via conduit 89 for possible recycle. The reel-shaped assembly 88 having a transition 89 is provided to give a tangential output from the bottom of hopper 82. When the rotor direction is reversed the assembly 88 may be unbolted from the lower flange 82b, inverted, and then bolted back onto flange 82b. Then the flared output transition 89 will again be tangential to the downwardly swirling coarse particle discharge path.

Figure 10:
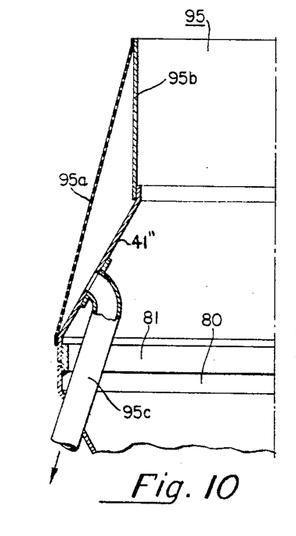
FIGURE 10 is an alternative form of a portion of the apparatus shown in FIGURE 7.

FIGURE 10 illustrates a feature that can be added to the form of the invention previously explained in connection with FIGURES 7-9. The lowest one of the conical members which slips around the ring 81 may be fitted with one or more apertures to which a hose or other conduit 95c may be coupled. The conduit 95c passes through an aperture in the wall of hopper 80 and is coupled to a suction source. Around the number 41" and the lower wall portion 95b of a generally cylindrical member a perforated conical wall 95a is disposed and attached by any desired means. When the suction source is active, any turbulent air lying just outside of the perforated wall 95a will be drawn off. Hence the upwardly spiralling stream of secondary air from the outside will proceed without undue impedance. This will increase the efficiency of the secondary classification operation.

Figure 11:
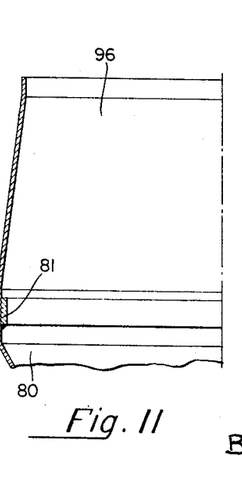
FIGURE 11 is still another alternative form of the apparatus shown in FIGURE 7 shown in a sectional view.

FIGURE 11 shows an example of a very wide and slightly inclined member 96 in which there are no discontinuities such as, for example, exist at the junction of the member 42' and the member 41'.

Modifications and variations

While several forms of the invention have been described above, it should be appreciated that many others are possible. For example, instead of having a single member 42 as shown in FIGURE 2, for example, there can be provided therein an additional take-off member for a certain part of the fines. This additional member might consist of a tubular member mounted coaxially with member 42 and having a diameter smaller than the diameter of the opening 46. In this way, it would be possible to extract the most centrally located, i.e., the smallest of the fine particles. The next smallest particles would be extracted via the space between the tubular member and the walls 42 and 41 and go out through the fines discharge volute 60.

Figure 12:
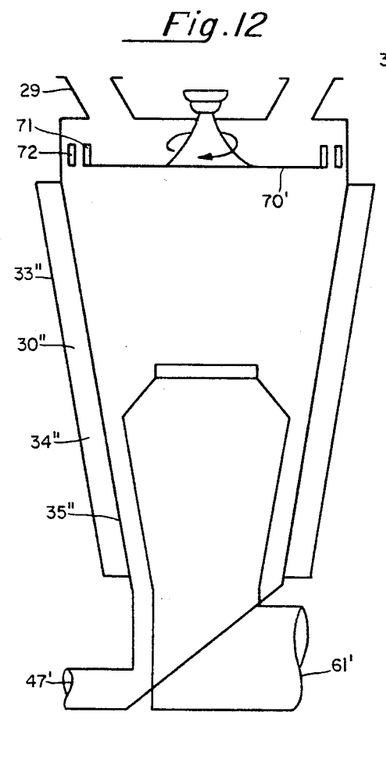
FIGURE 12 is a schematic elevation view of another form of this invention.

Another variation of the present invention is shown in schematic form in FIGURE 12 which is somewhat similar to the embodiment shown in FIGURE 7. However, instead of having a straight up and down perforated wall 35′, its counterpart 35″ is inclined downwardly and inwardly like a truncated conical member. This configuration, because of the vortex effect produced by a gas proceeding through a tapering enclosure, tends to increase the speed of the air-particle stream throughout the length of the classification zone. Thus, the efficiency of the classification operation is enhanced. As a corollary, the secondary classification zone therein is considerably constricted. This means that air drawn into this zone from the outside will also have an increased component of velocity upwards which can equalize or possibly exceed the increase in the downward velocity component. Also, with this apparatus slimmer coarse and fine discharge hoppers (or equivalents) may be employed as well as narrower output ducts connected thereto.

Figure 13:
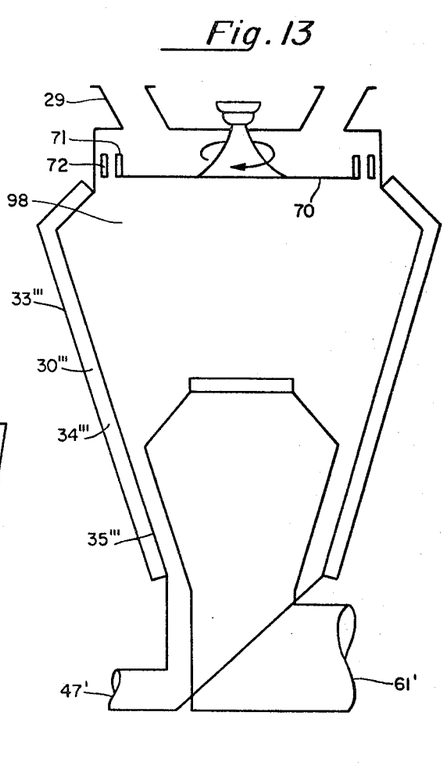
FIGURE 13 is a schematic elevation view of still another form of this invention.

FIGURE 13 shows still another form of the invention in which the inwardly sloping classification region is disposed just below an outwardly flaring portion 98. The region 98 is provided to allow the coarse and fine particles which enter the classification section mixed closely together to separate under the influence of centrifugal force almost as soon as they are produced thereby tending to prevent reagglomeration. Thus, the coarse particles will tend to move rapidly outward whereas the fine particles will move more or less straight down and out of the way of the coarse particles. Prevention of reagglomeration is of importance when the materials being processed or classified have a tendency to stick to one another. This may be true in the case of some thermoplastic materials, somewhat moist or oily materials, and the like.

While the invention has been explained in terms of a combination of a classifier with a centrifugal impact mill, it should be clearly understood that this novel classifier may be employed without any mill or other rotary processing apparatus at all. For example, instead of the rotor-stator assembly at the top of the apparatus 15, a mixture of coarse and fine particles may be fed tangentially into this upper region such as by means of a volute input. The volute input would give the material to be classified an initial spiral flow pattern which would be coupled to the spiral (helical) flow pattern of the classifier itself.

Actually, the input material need not even be applied in a rotational gas feed but could be merely fed into the classifier input at one or more points near the perforated classifier wall. The inrushing air through the perforated wall would quickly impart the desired descending spiral flow stream to the gas-particle mixture.

The perforated outer wall of the classifier section may also be varied to suit particular requirements. The aperture size, the number of apertures, the angle of the apertures, their pattern of distribution, etc., may all be selected to accomplish particular desired objectives.

It should be remarked that the gases used for the primary and secondary classifications in their respective zones need not be the same. In some cases different gases may advantageously be used to perform operations on the particles in addition to acting as mere carriers. In those cases wherein the classifier section is used with a rotary processor, the latter can be any one or combination of apparatuses. The latter include a rotary hammer mill, a heater mill, an impact mill, or other device having a rotary member that sets up a spiralling movement of the gas and the mixture of particles entrained therein.

Some other modifications of the illustrative apparatus which does not depart from the essence of the present invention will occur to those skilled in the art upon reading of this specification and perusal of the drawings. Consequently, the invention should be limited solely by the claims herein.

I claim:
1. A classification apparatus comprising:
 (a) means toward the upper end of said apparatus for feeding thereto a mixture of various sized solid particles to be classified thereby,
 (b) means including a chamber defined by an apertured wall extending downward from said (a) means for creating a first spiral flow of gas in said chamber in which said mixture becomes entrained and the coarser particles are flung more outwardly than the finer ones thereof, and
 (c) means disposed toward the lower end of said apparatus and having an inlet opening positioned intermediate the ends thereof for removing finer particles, said means including gas-deflecting means in the path of said first flow which coacts with said (b) means to divert said first flow thereby to produce a second gas flow which moves finer particles upwardly from the lower region of said (b) means and inwardly into the vicinity of said inlet opening for removal thereby.

2. The apparatus according to claim 1 wherein said gas-deflecting means includes a surface extending downward from said inlet opening, wherein said second gas flow follows a spiral path, and wherein both of said spiral flows are substantially coaxial.

3. The classification apparatus according to claim 2 wherein said (c) means includes suction means coupled to said inlet opening, and wherein said gas is drawn into said apparatus through said apertured wall in response to the operation of said suction means.

4. The classification apparatus according to claim 3 wherein said (c) means includes a generally truncated hollow member whose surface is inclined upwardly and inwardly.

5. A classification apparatus comprising:
 (a) means toward the upper end of said apparatus for applying a mixture of various sized solid particles thereto under the influence of gravity,
 (b) means including a chamber defined by an apertured wall extending below said (a) means for subjecting said applied mixture to a first inwardly spiralling stream of a gas in said chamber whereupon said mixture becomes entrained in a first substantially helical flow of said gas which extends in a downward direction from its starting point, said flow tending to fling coarser ones of said particles more outwardly under the influence of centrifugal force than finer ones thereof,
 (c) means including gas deflecting means disposed in the path of said first flow toward the lower end of said (b) means for diverting said first flow thereby to produce a second substantially helical flow of said gas, said second flow being substantially coaxial with said first flow and extending from its starting point in the region of said lower end in an upward direction, said means having an upper terminal portion thereof with an opening formed therein, said opening extending intermediate the starting points of said helical paths and lying generally along the axes of said flows for removing by suction finer ones of said particles from said apparatus.

6. The classification apparatus according to claim 5 with the addition of (e) means disposed lower than said opening and outwardly thereof for removing coarser ones of said particles from said apparatus.

7. The classification apparatus according to claim 5 wherein said (a) applying means includes rotary processing apparatus in which said mixture is processed before application of said classification apparatus, said rotary processing apparatus imparting to said mixture and to a carrier gas therefor a downwardly and outwardly spiralling movement.

8. A classification apparatus comprising:
(a) a substantially vertical perforated wall toward the upper edge of which a mixture of various sized particles is applied inwardly thereof,
(b) a generally truncated conical member having an upper tapered terminal portion with an opening therein, said terminal portion being disposed intermediate the upper and lower ends of said (a) means,
(c) means located toward the lower end of said (a) means and outside of said (b) means for extracting coarser ones of said particles from said apparatus, and
(d) means coupled to said (b) means for producing suction which thereupon draws in air through said apertured (a) means whereby said applied material is entrained in a downwardly moving helical air path and air is drawn in through the lower portion of said (a) means against and around said (b) means to produce a rising helical flow of air, said downward helical path throwing coarser ones of said particles more outwardly than finer ones thereof for removal from said apparatus via said (c) means, said rising helical path entraining finer ones of said particles upward and inwardly toward said opening, said opening removing said lifted finer particles and said inwardly circulating finer particles in said downward helical path from said apparatus.

9. The apparatus according to claim 8 with the addition of curved wall members disposed in proximate relation to said (a) means and outwardly thereof and wherein the perforations in said (a) means are disposed at an angle to produce an inwardly moving spiral of said air within the confines of said (a) means.

10. The apparatus according to claim 8 wherein said conical member includes a solid upper wall portion and a lower apertured wall portion and means for establishing communication between said lower wall portion and the atmosphere external to said apparatus.

11. The apparatus according to claim 8 with the addition of (e) centrifugal impact milling means disposed above said (a) means which mills said particles and imparts an outwardly spiralling motion thereto before they are applied toward the upper edge of said (a) means.

12. A classification apparatus comprising:
(a) a substantially vertical and generally cylindrical perforated wall member having a plurality of substantially similar angled perforations formed therein,
(b) means for applying to the interior of said wall member a mixture of various sized solid particles inwardly of the upper edge thereof,
(c) at least one generally hollow, truncated conical member disposed within said wall member and substantially coaxial therewith, said conical member having a surface which inclines downwardly and outwardly from its upper edge, said upper edge being disposed intermediate the upper and lower extremities of said wall member,
(d) a first generally hollow receiving member disposed below said conical member and adjacent thereto, the interior of said first member communicating with the interior of said conical member, said first receiving member being adapted to be connected to a source of suction external to said apparatus whereupon said mixture becomes entrained within air entering said wall member via said apertures in the upper portion of said wall member, said air and entrained particles thereupon moving downward in a generally helical path, said path throwing coarser ones of said particles more outwardly than finer ones thereof, said suction also causing air to be drawn through said apertures in the lower part of said wall member generally opposite said inclined surface thereby producing a generally upward helical air stream which entrains finer particles in its path and carries them upwardly and inwardly toward the top edge of said conical member, said conical member removing from said apparatus the inwardly circulating finer particles from said downward path and said finer particles carried upward by said upward stream, and
(e) a second generally hollow receiving member disposed below said conical member and around said first receiving member, said first and second members being substantially coaxial, said second member enabling the withdrawal from said apparatus of the coarser ones of said particles which have been thrown more outwardly by said downward air path.

13. The classification apparatus according to claim 12 wherein said wall member is braced at a number of vertically spaced points by a plurality of rings in contact with its inner surface, said rings being generally parallel to one another.

14. The classification apparatus according to claim 12 with the addition of means surrounding said wall member for directing air external thereto in a generally angled path toward said angled apertures, said means being generally symmetrical so that it may be inverted if desired to direct air toward said apertures in the opposite direction.

15. The classification apparatus according to claim 12 with the addition of adjustable means disposed substantially in contact with said wall member for occluding desired ones of the apertures in said perforated wall member.

16. The classification apparatus according to claim 12 wherein there are a plurality of said generally hollow truncated conical members which fit upon one another, the lower edge of the upper conical members fitting closely about the upper edge of the next lower conical member and being demountable therefrom.

17. The classification apparatus according to claim 12 wherein said first and second receiving members are generally conical members having substantially parallel surfaces which are inclined downwardly and inwardly, the space between said surfaces transporting said coarser particles away from said perforated wall member.

18. A classification apparatus comprising:
(a) a substantially vertical perforated wall member of generally circular cross-section, said wall member having a downwardly and inwardily sloping surface and also having a plurality of substantially similar angled perforations formed therein.
(b) means for applying to the interior of said wall member a mixture of various sized solid particles inwardly of the upper edge thereof,
(c) at least one generally hollow truncated conical means disposed within the said wall member and substantially coaxial therewith, said conical member having a surface which inclines downwardly and outwardly from the upper edge thereof, said upper edge being disposed intermediate the upper and lower extremities of said wall member,
(d) a first generally hollow receiving member disposed below said conical member and adjacent thereto, the interior of said first member communicating with the interior of said conical member, said first member being adapted to be connected to a source of suction, and
(e) a second generally hollow receiving member disposed below said conical member and round said first receiving member, said first and second members being substantially coaxial, said first member enabling the withdrawal of finer ones of said particles from said apparatus, said second member enabling the withdrawal of coarser ones of said particles from said apparatus.

19. A classification apparatus comprising:
(a) means for producing a confined downwardly spiraling flow of a carrier gas in which a mixture of different sized particles is entrained, said means having a substantially circular cross section having a predetermined inner diameter,
(b) a first generally conical perforated wall member having a plurality of substantially similar angled perforations formed therein, said first wall member having a surface which inclines downwardly and outwardly from its upper edge, said first wall member having a generally circular cross-section whose diameter is larger than said inner diameter of said (a) means,
(c) a second wall member disposed adjacent the lower edge of said first wall member and having a plurality of substantially similar angled perforations formed therein, said second wall member having a downwardly and inwardly tapering surface,
(d) a generally hollow member surrounded by said second wall portion and being substantially coaxial therewith, said hollow member having an opening at its upper edge and a surface which inclines downwardly and outwardly from said edge, said upper edge being disposed intermediate the upper and lower extremities of said second wall member,
(e) a first generally hollow receiving member disposed below said (d) hollow member and adjacent thereto, the interior of said first member communicating with the interior of said (d) heollow member, said first receiving member being adapted to be connected to a source of suction, and
(f) a second generally hollow receiving member disposed below said (d) hollow member and around said first receiving member, said first and second members being substantially coaxial, said first member and said (d) hollow member cooperating to enable removal of finer ones of said particles from said apparatus, said second member enabling the withdrawal of coarser ones of said particles from said apparatus.

20. A process for classifying a mixture of various sized particles in a vertical classifying zone which includes the steps of:
(a) feeding said mixture into said zone toward the upper end thereof,
(b) creating a first inwardly spiralling flow of the gas throughout said zone, said mixture becoming entrained in said zone whereupon the coarser particles are flung more outwardly than the finer ones thereof,
(c) deflecting said inwardly spiralling flow of gas from a surface on which it impinges in the region of the lower end of said zone thereby to induce a second upward and inward gas flow in which finer particles are entrained, and
(d) removing at a point intermediate the ends of said zone finer particles which have circulated inwardly and downwardly in said first flow and finer particles which have been moved upwardly and inwardly by said second flow.

References Cited

UNITED STATES PATENTS

| | | | |
|---|---|---|---|
| 1,675,941 | 7/1928 | Lindsay | 209—144 X |
| 2,252,581 | 8/1941 | Saint-Jacques | 209—144 |
| 2,507,507 | 5/1950 | Egedal | 241—74 X |
| 2,199,015 | 4/1940 | Toensfeldt | 209—144 X |
| 2,999,593 | 9/1961 | Stern | 209—144 |
| 3,313,413 | 4/1967 | Decellier | 209—211 |

FRANK W. LUTTER, *Primary Examiner.*

U.S. Cl. X.R.

209—144